(12) United States Patent
Hindman et al.

(10) Patent No.: US 8,718,811 B2
(45) Date of Patent: May 6, 2014

(54) MODELING SHEET METAL TRANSITIONAL SHAPES WITH MANUFACTURING INTENT AND RESULTS

(75) Inventors: Seth A. Hindman, Lake Oswego, OR (US); Gerald Hochenauer, Poechlam (AT); Matthew J. Bussey, Phoenix, AZ (US)

(73) Assignee: Autodesk, Inc., San Rafael, CA (US)

( * ) Notice: Subject to any disclaimer, the term of this patent is extended or adjusted under 35 U.S.C. 154(b) by 1024 days.

(21) Appl. No.: 12/624,289

(22) Filed: Nov. 23, 2009

(65) Prior Publication Data
US 2010/0138021 A1 Jun. 3, 2010

Related U.S. Application Data

(60) Provisional application No. 61/118,951, filed on Dec. 1, 2008.

(51) Int. Cl.
*G06F 19/00* (2011.01)

(52) U.S. Cl.
USPC ............ 700/165; 700/95; 700/145; 700/182; 345/419; 345/420; 345/441; 345/442; 703/1; 703/2

(58) Field of Classification Search
USPC ............ 700/95, 145, 165, 182; 345/419, 420, 345/441, 442; 703/1, 2
See application file for complete search history.

(56) References Cited

U.S. PATENT DOCUMENTS

| 6,542,937 B1 * | 4/2003 | Kask et al. ............... 719/328 |
| 2007/0225847 A1 * | 9/2007 | Pietsch et al. ............. 700/98 |

OTHER PUBLICATIONS

Floater, Michael S. "Parametrization and Smooth Approximation of Surface Triangulations." Computer Aided Geometric Design 14.3 (1997): 231-50.*
Berry, A., J. Bordat, P. Heggernes, G. Simonet, and Y. Villanger. "A Wide-range Algorithm for Minimal Triangulation from an Arbitrary Ordering." Journal of Algorithms 58.1 (2006): 33-66.*
McGraw-Hill Machining and Metalworking Handbook (3rd Edition), Sections 9.6, 9.7, and 9.12, 12 pages (2006).

* cited by examiner

*Primary Examiner* — Mohammad Ali
*Assistant Examiner* — Sheela S Rao
(74) *Attorney, Agent, or Firm* — Gates & Cooper LLP (57) ABSTRACT

A method, apparatus, and article of manufacture provide the ability to generate a lofted sheet metal model. User input is accepted that obtains two input profiles. A triangulated lofted shape is generated that transitions between the two profiles. The triangulated lofted shape is adjusted to reflect a manufacturing process. A manufacturable lofted sheet metal shape is then generated based on the adjusted triangulated lofted shape.

27 Claims, 11 Drawing Sheets

MODELING SHEET METAL TRANSITIONAL SHAPES WITH MANUFACTURING INTENT AND RESULTS

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 61/118,951, filed Dec. 1, 2008, by Seth A. Hindman, Gerald Hochenauer, and Matthew J. Bussey, entitled "MODELING SHEET METAL TRANSITIONAL SHAPES WITH MANUFACTURING INTENT AND RESULTS," attorneys' docket number 30566.453-US-P1

BACKGROUND OF THE INVENTION

1. Field of the Invention

The present invention relates generally to sheet metal, and in particular, to a method, apparatus, and article of manufacture for creating true manufacturing data and a true manufacturable lofted sheet metal shape.

2. Description of the Related Art

Many users design transitional (or lofted) sheet metal shapes for items such as air ducting, chutes, covers, etc., and design them using "smooth" transitions around the surface because designing that way is easy. However, when manufactured, many of these parts are not manufactured with these complex bends because of tooling costs. Instead, they "triangulate" the deformed area and create it using a series of regular bends and flat areas.

Modeling the true manufactured part is very hard to do, and creating the manufacturing pattern from a "smooth" model is a time intensive process. What is needed (and is lacking from the prior art) is the capability for a user to create a model "as manufactured", while using the simplicity of creating design like they would with a smooth model. The problems of the prior art may be better understood with an explanation of prior art methods for developing triangulated shapes and bend lines.

Figure 1:
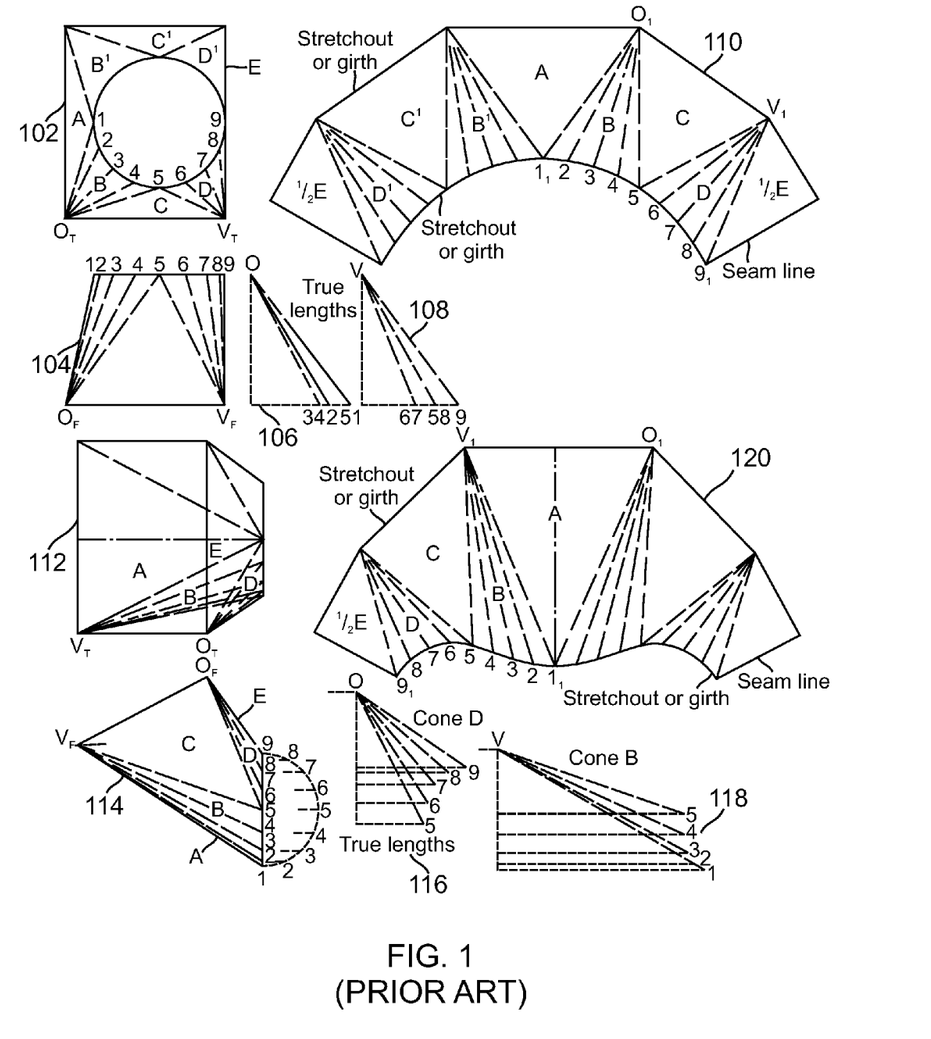
FIG. 1 illustrates examples of developing a triangulated transitional shape in the prior art.

FIG. 1 illustrates examples of developing a triangulated transitional shape in the prior art. As shown, the user must manually create the various triangulations and transitional shapes to enable a manufacturing pattern that can be used to produce an accurate model. For example, to create shape 102, triangulations are manually created as shown by images 104-108 with the true lengths mapped out. The resulting pattern is shown at 110. Similarly, to create shape 112, the transitional shapes 114-118 are used to create pattern 120. Such a creation process is time and processor intensive.

In the prior art, the problem with creating the transitional shapes and the flat pattern for manufacturing was solved in one of two ways:

A first method solved the problem by creating a series of cosmetic "bend lines" to approximate where the standard bends would be created. This suffered from three major problems:

(1) The bend lines could not be adjusted on a bend zone by bend zone basis, so the bend lines were not necessarily in an accurate location nor did they have the necessary flexibility to accurately use the flat pattern;

(2) The bend lines had no associated bend manufacturing information since the model was still smooth, the bend angle to bend the part at each bend line could not be calculated, so manual triangulation had to be done regardless; and (3) Since the competition did not automatically generate an accurate starting and ending profile, users in certain competitive packages had to create a more complex profile just to get these cosmetic bend lines.

Figure 2:
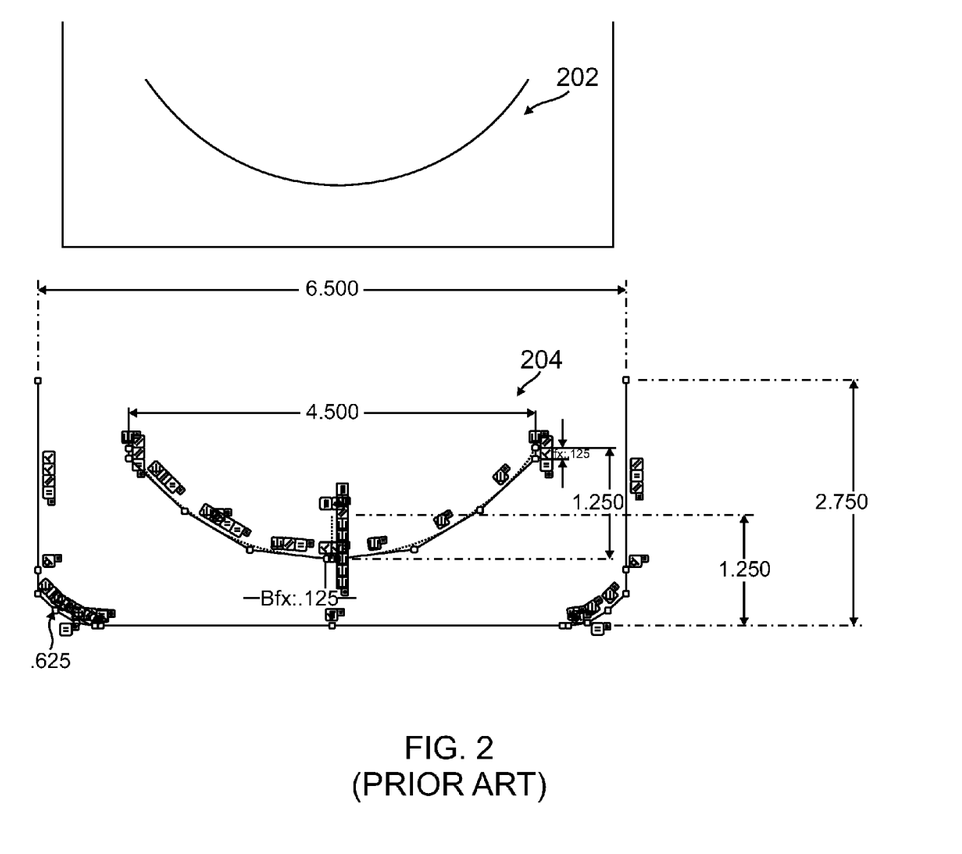
FIG. 2 illustrates two figures used to manually create the sketch profile to create the "triangulated" shape of the prior art.

The second method of solving the problem was to manually calculate and build the "triangulated" model from scratch in the software. Such an approach was a time consuming, manual, and error prone process, and changing or editing the design was very difficult. FIG. 2 illustrates two figures used to manually create the sketch profile to create the "triangulated" shape of the prior art. A simple input profile 202 is used, followed by the manual calculation and building of the manual triangulation profile 204.

SUMMARY OF THE INVENTION

One or more embodiments of the invention allows the user to create a simple set of profiles to describe the overall shape, automatically generate the triangulated shape, flexibly adjust the triangulated shape to reflect the exact manufacturing process and procedure, and generate the true manufactured lofted sheet metal part. Embodiments also generate an accurate, reliable flat pattern for manufacturing with the correct manufacturing data (bend line position, bend angles, etc.) for direct input into numerical control (NC) devices or drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

One or more embodiments of the invention provide the ability to:

Create a true manufacturable lofted sheet metal shape, instead of simply a "smooth" lofted sheet metal shape;

Generate the accurate, true manufacturing data for a lofted sheet metal shape; and Allow design of lofted sheet metal shapes with converging bends and creation of an accurate flat pattern.

Hardware and Software Environment

Figure 3:
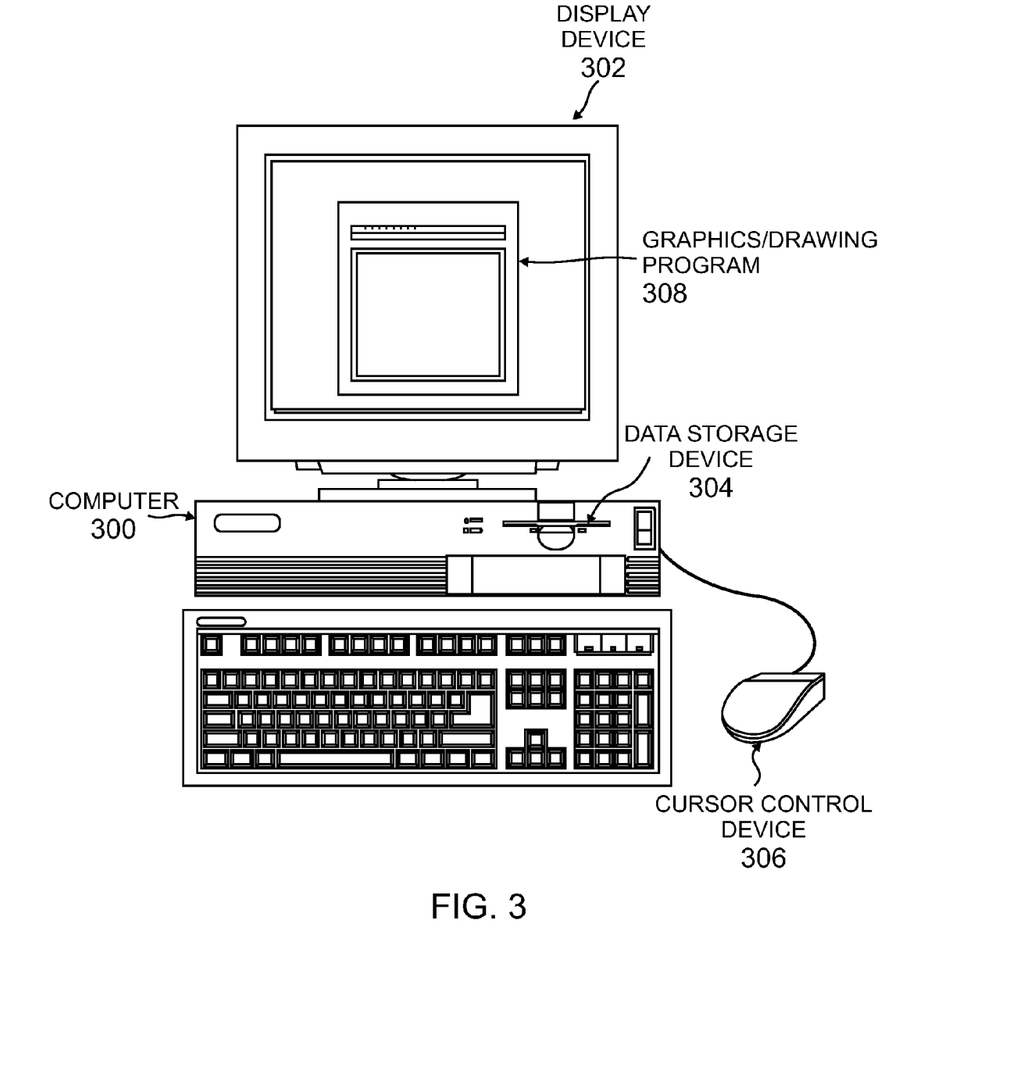
FIG. 3 is an exemplary hardware and software environment used to implement one or more embodiments of the invention.

FIG. 3 is an exemplary hardware and software environment used to implement one or more embodiments of the invention. Embodiments of the invention are typically implemented using a computer 300, which generally includes, inter alia, a display device 302, data storage devices 304, cursor control devices 306, and other devices. Those skilled in the art will recognize that any combination of the above components, or any number of different components, peripherals, and other devices, may be used with the computer 300.

One or more embodiments of the invention are implemented by a computer-implemented graphics program 308, wherein the graphics program 308 is represented by a window displayed on the display device 302. Generally, the graphics program 308 comprises logic and/or data embodied in or readable from a device, media, carrier, or signal, e.g., one or more fixed and/or removable data storage devices 304 connected directly or indirectly to the computer 300, one or more remote devices coupled to the computer 300 via a data communications device, etc.

Some or all of the operations performed by the computer 300 according to the computer program (e.g., graphics program 308) instructions may be implemented in a special purpose processor within computer 300. In this embodiment, some or all of the computer program 308 instructions may be implemented via firmware instructions stored in a read only memory (ROM), a programmable read only memory (PROM) or flash memory within the special purpose processor or in memory. The special purpose processor may also be hardwired through circuit design to perform some or all of the operations to implement the present invention. Further, the special purpose processor may be a hybrid processor, which includes dedicated circuitry for performing a subset of functions, and other circuits for performing more general functions such as responding to computer program instructions. In one embodiment, the special purpose processor is an application specific integrated circuit (ASIC).

In one or more embodiments, instructions implementing the graphics program 308 are tangibly embodied in a computer-readable medium, e.g., data storage device 304, which could include one or more fixed or removable data storage devices, such as a zip drive, floppy disc drive, hard drive, CD-ROM drive, DVD drive, tape drive, etc. Further, the graphics program 308 is comprised of instructions which, when read and executed by the computer 300, causes the computer 300 to perform the steps necessary to implement and/or use the present invention or to load the program of instructions into a memory, thus creating a special purpose data structure causing the computer to operate as a specially programmed computer executing the method steps described herein. Graphics program 308 and/or operating instructions may also be tangibly embodied in a memory and/or data communications devices of computer 300, thereby making a computer program product or article of manufacture according to the invention. As such, the terms "article of manufacture" and "computer program product" as used herein are intended to encompass a computer program accessible from any computer readable device or media.

Those skilled in the art will recognize that the exemplary environment illustrated in FIG. 3 is not intended to limit the present invention. Indeed, those skilled in the art will recognize that other alternative environments may be used without departing from the scope of the present invention.

Software Embodiments

One or more embodiments of the invention utilize a graphics/drawing program 308 to perform modeling (solid modeling or otherwise) of a lofted shape. Such modeling may be used to create a sheet metal pattern to be used to manufacture a desired lofted shape.

Figure 4:
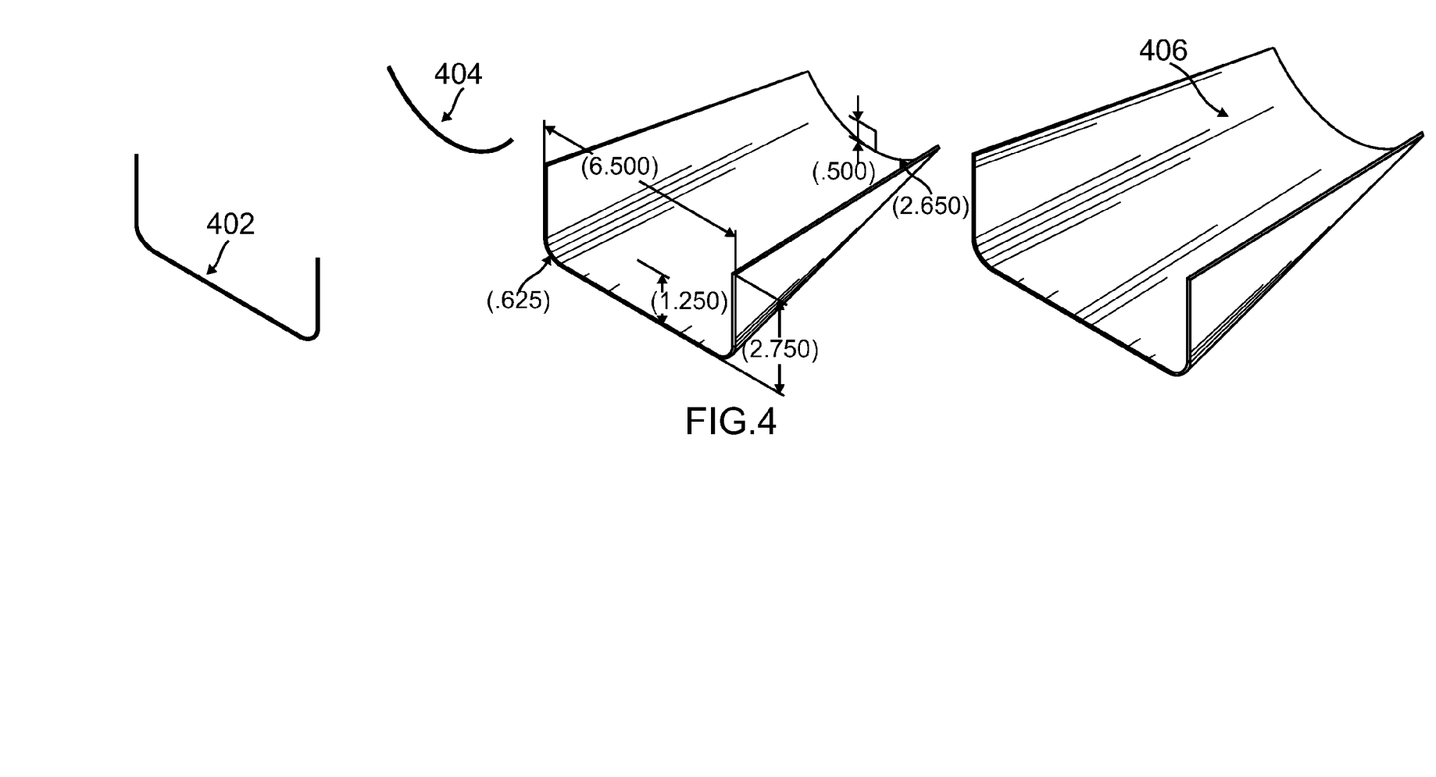
FIG. 4 illustrates the creation of a lofted shape (i.e., the smooth output shape) from two simple inputs, a half rectangle, and an arc in accordance with one or more embodiments of the invention.

Creation of a lofted shape is typically done by creating a simple start and end profile. FIG. 4 illustrates the creation of a lofted shape (i.e., the smooth output shape 406) from two simple inputs, a half rectangle 402, and an arc 404. When a standard loft 406 is created between these two profiles 402 and 404, a smooth but non-linear surface 406 is created to transition from one area 402 to another 404. While such a design appears pretty and easy to create from a modeling standpoint, the typical manufacturing process of triangulation is not reflected.

Figure 5:
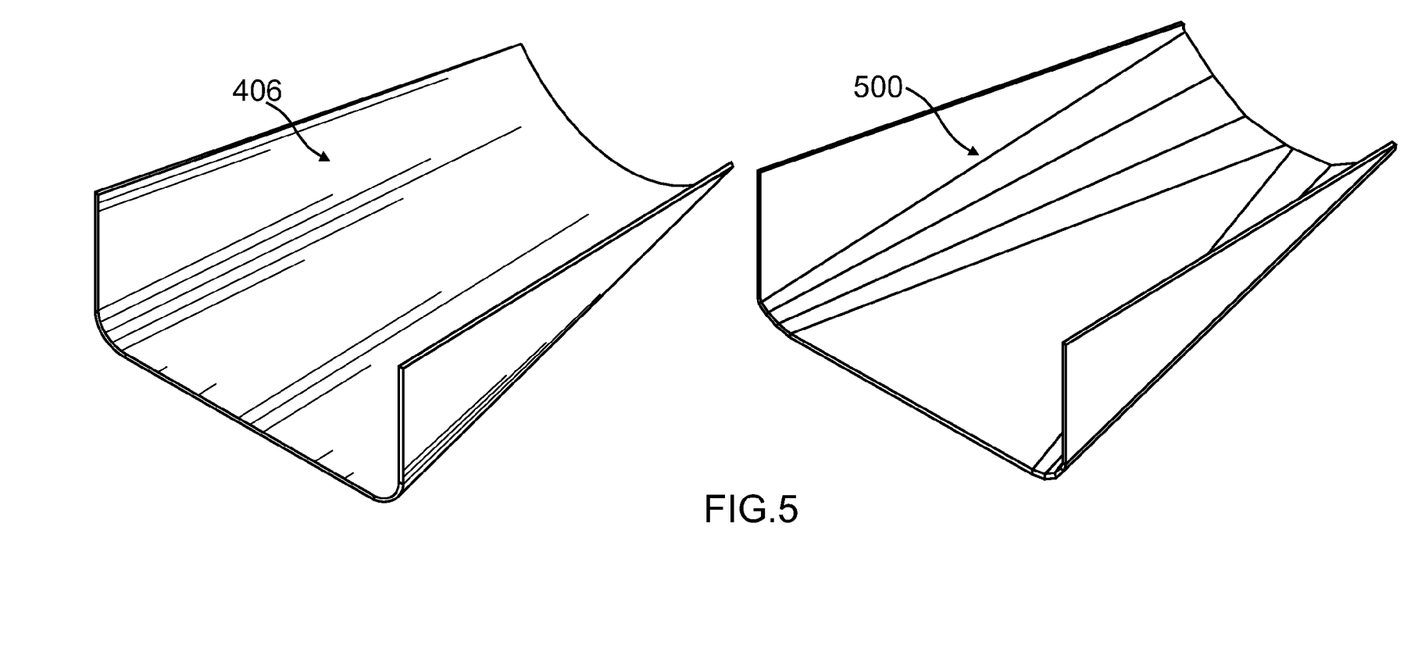
FIG. 5 illustrates a comparison of the smooth shape versus a manufactured part (that is "triangulated" or "prismatic" in nature) in accordance with one or more embodiments of the invention.

FIG. 5 illustrates a comparison of the smooth shape 406 versus a manufactured part 500 (that is "triangulated" or "prismatic" in nature). In accordance with one or more embodiments of the invention, a user creates the standard simple input profiles 402/404 as illustrated in FIGS. 3 and 4, but automatically applies a standard set of triangulation rules to "break up" the complex surfaces into simple planes and cylinders, creating a lofted shape 500 that reflects the standard manufacturing process.

Figure 6:
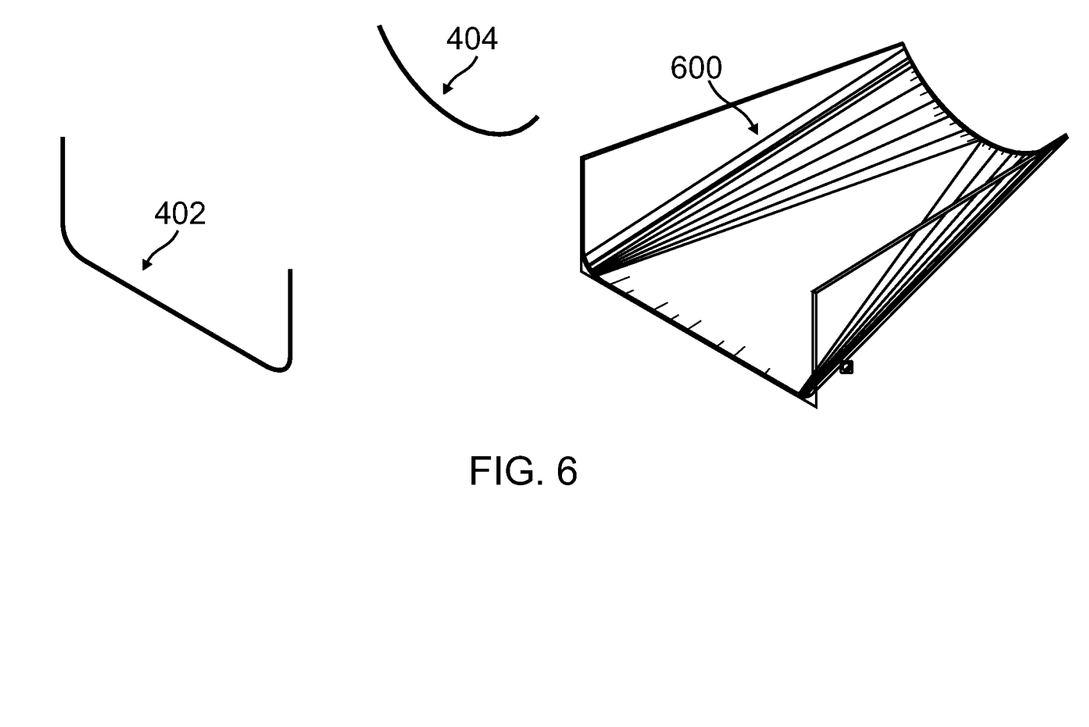
FIG. 6 illustrates the ability to obtain/get a standard "triangulated shape" (i.e., the press break shape) from the "smooth" input curves (i.e., the simple input profiles) in accordance with one or more embodiments of the invention.

FIG. 6 illustrates the ability to obtain/get a standard "triangulated shape" 600 (i.e., a press break shape) from the "smooth" input curves 402 and 404 (i.e., the simple input profiles) in accordance with one or more embodiments of the invention. To acquire/obtain the triangulated shape 600 (from input curves 402 and 404), a set of triangulation rules are applied. The standard set of triangulation rules may be specified by a user or may be stored in advance. The rules may perform the "break up" of the surfaces into simple planes and cylinders through a series of curve approximations. In this regard, as described above, there are commonly two simple input profiles 402 and 404 that are used to create a lofted geometry. The user specifies the two curves/profiles to be used to create the lofted geometry and identifies them (e.g., lofted shape 406 of FIG. 4) using a cursor control device and a dialog box that allows the user to specify different profiles 402 and 404. Such a dialog is described in further detail below with respect to FIG. 7. Corners (i.e., square corners) cannot result in a resulting manufactured pattern. Accordingly, any corner that is part of one of the profiles 402 and 404 is rounded. In this regard, an arc may be approximated for the square corner using any known technique.

Figure 7:
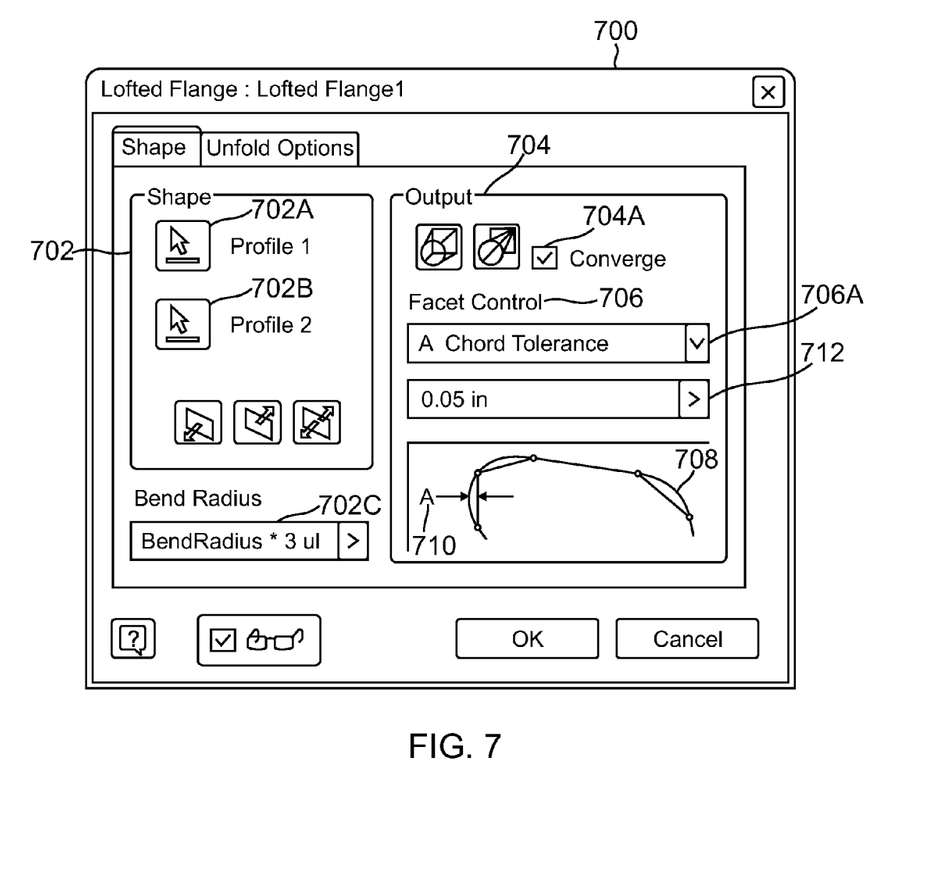
FIG. 7 illustrates an enlarged dialog box used to edit a lofted flange in accordance with one or more embodiments of the invention.

A user may first opt to create a lofted flange 406 (e.g., by invoking a menu or keyboard option). To create the lofted flange 406, the user may be presented with a dialog box that provides the ability to select input profiles and edit parameters for the flange. FIG. 7 illustrates an enlarged dialog box used to edit a lofted flange 406 in accordance with one or more embodiments of the invention. The user can elect to edit the input shape 402 and 404 (e.g., the profiles using boxes 702A and 702B or bend radius 702C) using area 702 of dialog box 700. Such boxes 702A/702B may be used or may prompt the user to select the input curves/profile 402/404 to utilize when creating the lofted flange 406. In addition, the user can edit the output 704 and select the "converge" option 704A to specify that the bends should converge to a single point. Further, the user can opt to edit the facet control 706. As illustrated, the user has selected the chord tolerance 706A from the drop down box and a graphical illustration 708 indicating the chord tolerance being edited is keynoted 710 and displayed with such keynotes in a small graphical image 708 within the dialog box 700. The user has the capability to further edit the measurement of the chord tolerance 712 (e.g., 0.05 in or an alternative measure). Different options may permit the user to define/edit the number of faces, the facet angle, or other options.

Accordingly, the user may have the option of controlling various parameters such as the chord tolerance 706A, facet angle, or facet distance. The chord tolerance 706A allows the user to set the maximum distance from a chord along the curve that is perpendicular to the curve. The facet angle represents the amount of degrees from the end of a facet to the tangency of the curve it is trying to model. The facet distance represents length of a facet from one edge of a bend to the next. Embodiments of the invention calculate the best fit for the facet distance. Once the various parameters are established, various simple planes and cylinders are created that extend from one profile 402 to the other profile 404 based on the type of smooth shape (e.g., lofted flange 406) selected and the arc approximations for any corners of the profile 402/404. Accordingly, as described herein, the arc approximation (i.e., for the corner), may consist of multiple different chord segments (that are based on the user parameters specified).

Once the complex surface (e.g., lofted geometry 406) has been broken up into simple planes and cylinders, the user can then adjust each individual bend area to reflect the exact manufacturing procedure required, by getting a high approximation of the original "smooth" surface (i.e. adding more bends and/or keeping the approximation of the two profiles 402/404 to a tight tolerance), or by keeping the manufacturing simple (i.e. lowering the number of bends and/or lowering the tolerance of the approximation so fewer process steps are required for manufacturing).

Figure 8:
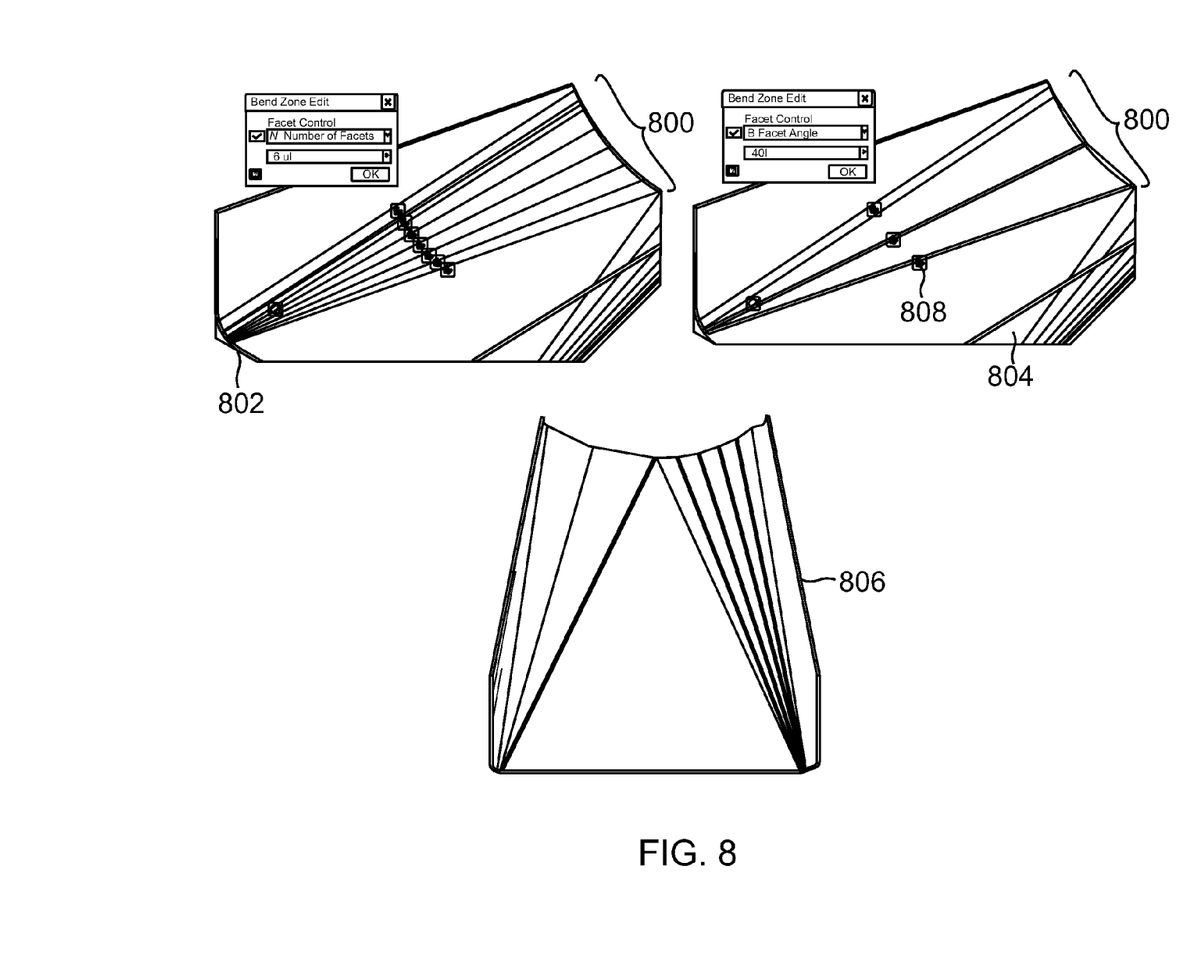
FIG. 8 illustrates individual bend "zones" that can be modified to meet manufacturing needs in accordance with one or more embodiments of the invention.

FIG. 8 illustrates individual bend "zones" that can be modified to meet manufacturing needs. Such flexibility may be useful in parts that are not symmetric. As illustrated in FIG. 8, the number of bend zones 800 is reduced from image 802 to image 804 thereby reducing the number of bends created in manufacturing. Manufactured part 806 illustrates a non-symmetric part where one can view a comparison of the limited number of bend zones (left side of 806) to a larger number of bend zones (right side of 806).

The user can manually change/edit the bend zones using cursor control drag operations on icons or graphic manipulators (e.g., boxes 808) in the drawing. Alternatively, dialog boxes or menu options can be presented to the user to allow the user to edit the number of facets, the facet angle, etc.

Figure 9:
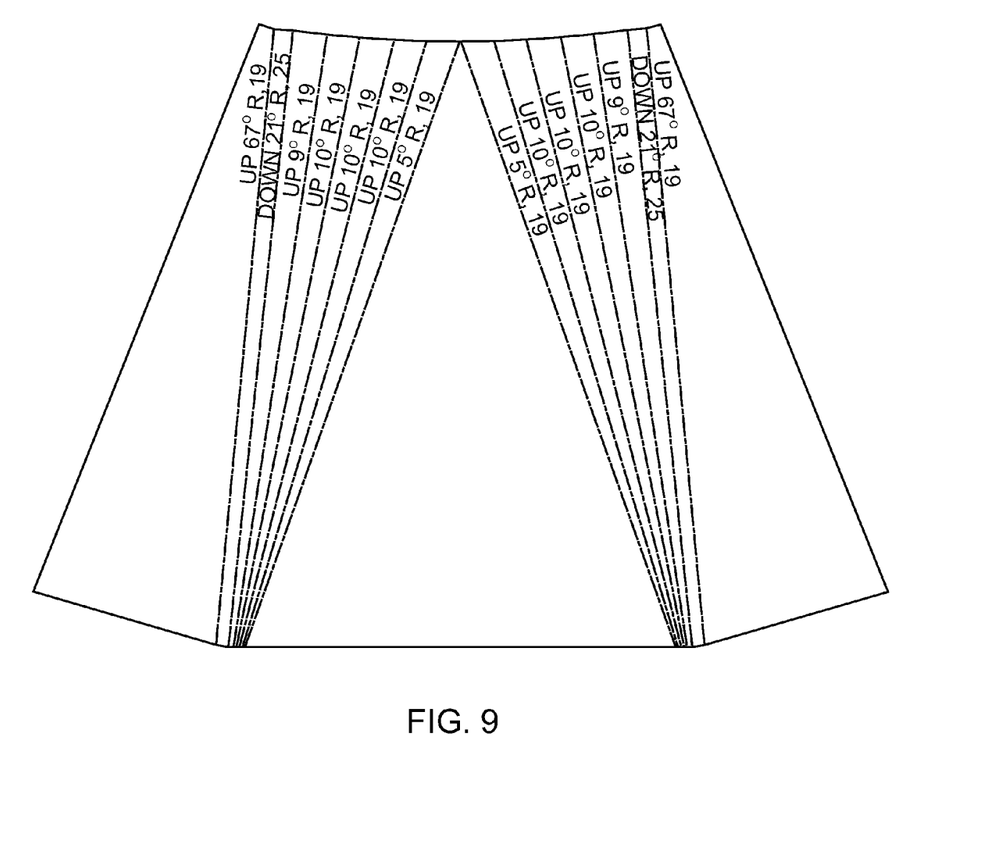
FIG. 9 illustrates the press break flat pattern with bend manufacturing information produced in accordance with one or more embodiments of the invention.

Since the end result is a model 806 that is true to the manufactured model, the flat pattern created has the exact bend lines and the exact bend information required for manufacturing, eliminating the need for manual tests and methods to calculate the manufacturing process information. FIG. 9 illustrates a press break flat pattern with bend manufacturing information based on the model 806 and produced in accordance with one or more embodiments of the invention.

Figure 10:
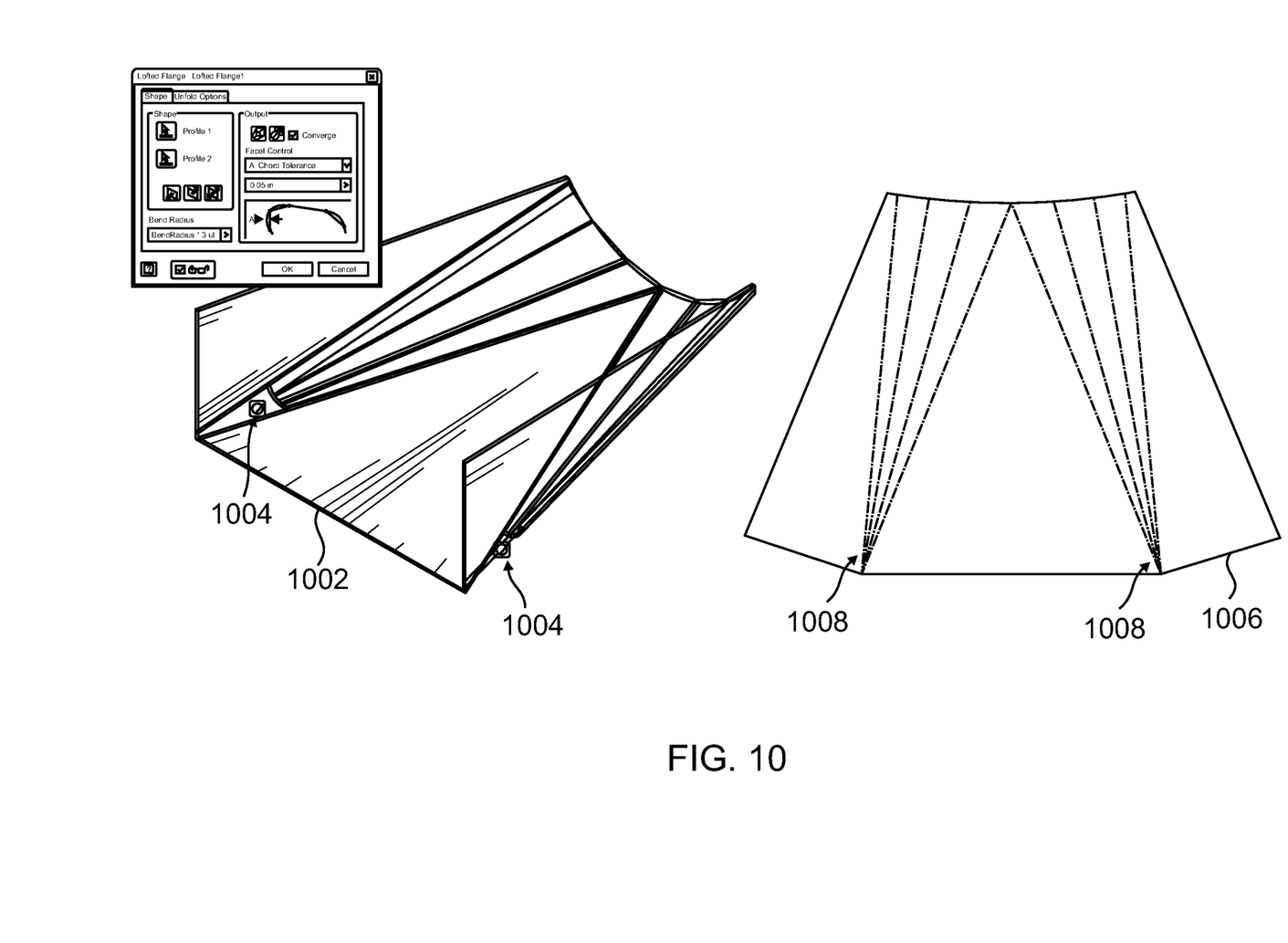
FIG. 10 illustrates converging bends (i.e., bends that go to/converge on the same point on a side) that can be handled by creating the correct flat pattern in accordance with one or more embodiments of the invention.

Embodiments of the invention may also allow for the manufacturable bends (as illustrated in FIG. 9) to converge at a single point. In reality, convergence at a single point is how many parts are manufactured, but in the mathematical model, these merged areas cannot be solved to create a flat pattern. While these merged areas are not filled in a 3D model, they can be accurately reproduced in a flat model so an accurate part can be made. FIG. 10 illustrates converging bends (i.e., bends that go to/converge on the same point on a side) that can be handled by creating the correct flat pattern. In model 1002, bends converging to a single point (illustrated by icons 1004) cannot be modeled in the 3D model 1002 accurately. However, in the flat pattern for manufacturing 1006, the bend geometry that converges to a single point can be created (illustrated at 1008). Accordingly, using the flat model/pattern 1006, an accurate part can be manufactured.

Logical Flow

Figure 11:
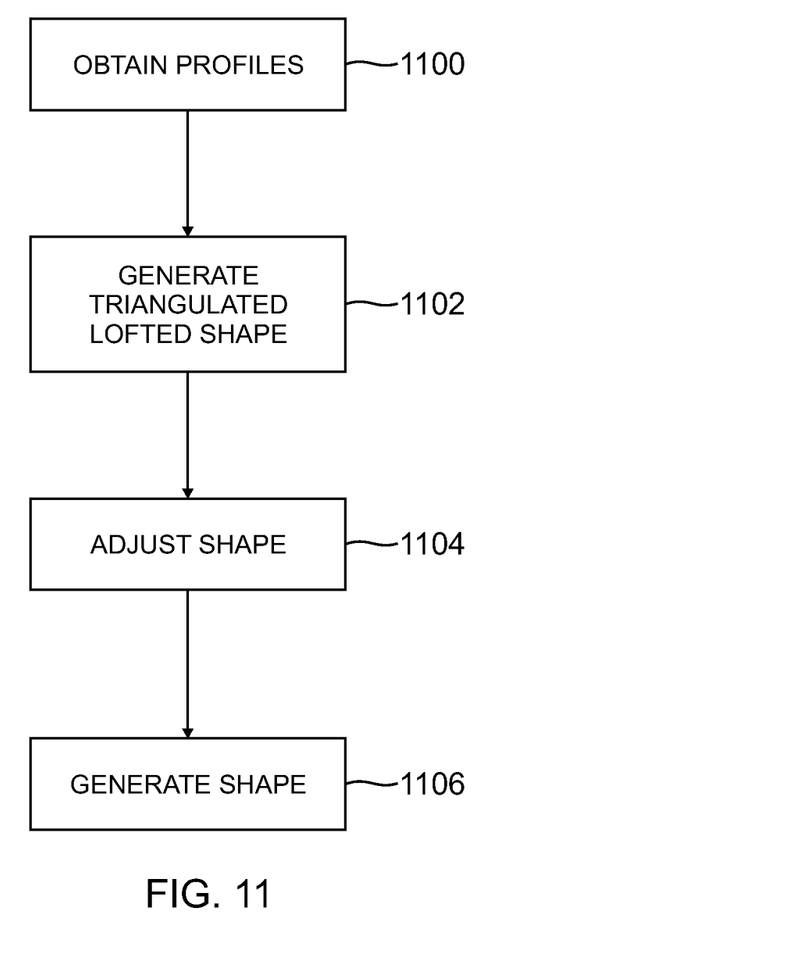
FIG. 11 is a flow chart illustrating the logical flow for generating a lofted sheet metal model in accordance with one or more embodiments of the invention

FIG. 11 is a flow chart illustrating the logical flow for generating a lofted sheet metal model in accordance with one or more embodiments of the invention. At step 1100, a first input profile and a second input profile are obtained. Such input profiles may be created or selected via user input that is accepted by a computer program.

At step 1102, a triangulated lofted shape that transitions from the first input profile to the second input profile is generated. Such a generation may create a smooth non-linear surface for the transition between the profiles. Further, the generation may further apply a set of one or more triangulation rules to break up the smooth non-linear surface into the triangulated lofted shape (i.e., into one or more simple planes or cylinders). The triangulation rules may be established by a user setting/configuring various parameters. In such an implementation, the rule may specify a value for a chord tolerance, facet angle, or a facet distance. Thereafter, the application of the rules to generate the triangulated lofted shape is performed automatically and independently from any user actions (i.e., without additional user input). Accordingly, complex calculations do not need to be and are not performed manually by a user.

At step 1104, the triangulated lofted shape may be adjusted to reflect a manufacturing process. Such adjusting may allow a user to input or adjust the user parameters that were used to generate the lofted shape. Alternatively, the user can adjust a total number of bends of the triangulated lofted shape (e.g., by adding more bends to more closely approximate the input profiles and create a "smoother" surface or by lowering the number of bends to keep the eventual manufacturing simple). Further, an approximation/tolerance of an approximation to the profiles may be adjusted to increase/decrease an eventual manufacturing process that would be based on the end model.

At step 1106, a manufacturable lofted sheet metal shape is generated that is based on the adjusted triangulated lofted shape. In other words, a true manufacturable lofted sheet metal shape is generated instead of simply a "smooth" lofted sheet metal shape. Such a generation of a manufacturable shape may further include the generation of a flat pattern that can be used to manufacture a lofted sheet metal part. In addition, the generation of the manufacturable shape may also include the generation of manufacturing data for direct input into a numerical control device that is used to manufacture the part. Consequently, not only is the shape generated (and possibly displayed on a display device) but an actual manufactured part may also be produced.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for generating a lofted sheet metal model, comprising:
   accepting input from a user for obtaining a first input profile and a second input profile;
   generating a triangulated lofted shape that transitions from the first input profile to the second input profile, wherein the generating comprises:
      creating a smooth non-linear surface that transitions from the first input profile to the second input profile; and
      applying a set of one or more triangulation rules to break up the smooth non-linear surface into the triangulated lofted shape, wherein the triangulated lofted shape comprises one or more simple planes or cylinders;
   adjusting the triangulated lofted shape to reflect a manufacturing process; and
   generating a manufacturable lofted sheet metal shape based on the adjusted triangulated lofted shape.

2. The method of claim 1, wherein the set of one or more triangulation rules comprise a rule specifying a value for a chord tolerance.

3. The method of claim 1, wherein the set of one or more triangulation rules comprise a rule specifying a value for a facet angle.

4. The method of claim 1, wherein the set of one or more triangulation rules comprise a rule specifying a value for a facet distance.

5. The method of claim 1, wherein:
   the one or more triangulation rules are configured by a user; and
   the applying of the set of one or more triangulation rules is performed automatically and independently from any user actions.

6. The method of claim 1, wherein the adjusting further comprises accepting user input adjusting the triangulated lofted shape.

7. The method of claim 1, wherein the adjusting modifies a total number of bends of the triangulated lofted shape.

8. The method of claim 1, wherein the generating of the manufacturable lofted sheet metal shape comprises generating a flat pattern that can be used to manufacture a lofted sheet metal part.

9. The method of claim 1, wherein the generating of the manufacturable lofted sheet metal shape further comprises generating manufacturing data for direct input into a numerical control device.

10. An apparatus for generating a lofted sheet metal model in a computer system comprising:
   (a) a computer having a memory;
   (b) an application executing on the computer, wherein the application is configured to:
      (i) accept input from a user for obtaining a first input profile and a second input profile;
      (ii) generate a triangulated lofted shape that transitions from the first input profile to the second input profile by:
         creating a smooth non-linear surface that transitions from the first input profile to the second input profile; and
         applying a set of one or more triangulation rules to break up the smooth non-linear surface into the triangulated lofted shape, wherein the triangulated lofted shape comprises one or more simple planes or cylinders;
      (iii) adjust the triangulated lofted shape to reflect a manufacturing process; and
      (iv) generate a manufacturable lofted sheet metal shape based on the adjusted triangulated lofted shape.

11. The apparatus of claim 10, wherein the set of one or more triangulation rules comprise a rule specifying a value for a chord tolerance.

12. The apparatus of claim 10, wherein the set of one or more triangulation rules comprise a rule specifying a value for a facet angle.

13. The apparatus of claim 10, wherein the set of one or more triangulation rules comprise a rule specifying a value for a facet distance.

14. The apparatus of claim 10, wherein:
   the one or more triangulation rules are configured by a user; and
   the application is configured to apply the set of one or more triangulation rules automatically and independently from any user actions.

15. The apparatus of claim 10, wherein the application is configured to adjust by accepting user input adjusting the triangulated lofted shape.

16. The apparatus of claim 10, wherein application is configured to adjust by modifying a total number of bends of the triangulated lofted shape.

17. The apparatus of claim 10, wherein the application is configured to generate the manufacturable lofted sheet metal shape by generating a flat pattern that can be used to manufacture a lofted sheet metal part.

18. The apparatus of claim 10, wherein the application is configured to generate the manufacturable lofted sheet metal shape by further generating manufacturing data for direct input into a numerical control device.

19. A computer readable storage medium encoded with computer program instructions which when accessed by a computer cause the computer to load the program instructions to a memory therein creating a special purpose data structure causing the computer to operate as a specially programmed computer, executing a method of generating a lofted sheet metal model, comprising:
   accepting, in the specially programmed computer, input from a user for obtaining a first input profile and a second input profile;
   generating, in the specially programmed computer, a triangulated lofted shape that transitions from the first input profile to the second input profile, wherein the generating comprises:
      creating, in the specially programmed computer, a smooth non-linear surface that transitions from the first input profile to the second input profile; and
      applying, in the specially programmed computer, a set of one or more triangulation rules to break up the smooth non-linear surface into the triangulated lofted shape, wherein the triangulated lofted shape comprises one or more simple planes or cylinders;

adjusting, in the specially programmed computer, the triangulated lofted shape to reflect a manufacturing process; and generating, in the specially programmed computer, a manufacturable lofted sheet metal shape based on the adjusted triangulated lofted shape.

20. The article of manufacture of claim 19, wherein the set of one or more triangulation rules comprise a rule specifying a value for a chord tolerance.

21. The article of manufacture of claim 19, wherein the set of one or more triangulation rules comprise a rule specifying a value for a facet angle.

22. The article of manufacture of claim 19, wherein the set of one or more triangulation rules comprise a rule specifying a value for a facet distance.

23. The article of manufacture of claim 19, wherein:
the one or more triangulation rules are configured by a user; and
the applying of the set of one or more triangulation rules is performed automatically and independently from any user actions.

24. The article of manufacture of claim 19, wherein the adjusting further comprises accepting, in the specially programmed computer, user input adjusting the triangulated lofted shape.

25. The article of manufacture of claim 19, wherein the adjusting modifies a total number of bends of the triangulated lofted shape.

26. The article of manufacture of claim 19, wherein the generating of the manufacturable lofted sheet metal shape comprises generating, in the specially programmed computer, a flat pattern that can be used to manufacture a lofted sheet metal part.

27. The article of manufacture of claim 19, wherein the generating of the manufacturable lofted sheet metal shape further comprises generating, in the specially programmed computer, manufacturing data for direct input into a numerical control device.

* * * * *